INVENTORS
Robert V. Jackson,
Wilford B. Burkett
WHANN & McMANIGAL
Attorneys for Applicant

United States Patent Office 3,426,213
Patented Feb. 4, 1969

3,426,213
DIRECT CURRENT STARTER-GENERATOR MECHANISM
Robert V. Jackson, Los Angeles, and Wilford B. Burkett, Pacific Palisades, Calif., assignors to McCulloch Corporation, Los Angeles, Calif., a corporation of Wisconsin
Filed Aug. 12, 1965, Ser. No. 479,110
U.S. Cl. 290—31                              1 Claim
Int. Cl. H02p *9/04;* H02k *23/52;* F02n *11/04*

ABSTRACT OF THE DISCLOSURE

A direct-current starter-motor-generator system for internal combination engines including a compound wound motor-generator where the wire of the shunt field coil has a positive temperature coefficient and has a size that causes a substantial decrease in the generated voltage of the motor-generator after the motor-generator has operated as a generator for a selected period of time.

---

This invention relates generally to starter-generators and relates more particularly to direct current starter-generators for internal combustion engines and the like.

While the invention has particular utility in connection with outboard engines or motors for boats, and is shown and described in such connection, it is to be understood that its utility is not confined thereto.

There are various well known problems and difficulties encountered in the provision of satisfactory generator-starters for such engines or motors as are used outboard on boats. For example, in conventional generator-starter mechanisms the charging current is modified by a 2- or 3-element electro-mechanical regulator when a conventional lead-acid battery is being charged. Such regulators are complicated, expensive, and subject to failure due to the severe engine vibrations to which they are subjected.

It is therefore an object of the present invention to provide a direct current starter-generator battery charging system or apparatus that solves these problems and overcomes the difficulties thereof.

More particularly it is an object of the invention to provide a system or apparatus of this character that is simple in construction and operation.

It is another object of the invention to provide a system or apparatus of this character that is not subject to failure from vibrations.

It is still another object of the invention to provide a system or apparatus of this character that is inexpensive to manufacture.

It is a further object of the invention to provide a direct current starter-generator system or apparatus that is directly coupled to the engine crankshaft for engine starting and the recovery of battery energy required for starting.

It is a still further object of the invention to provide apparatus of this character providing battery charging current regulation from a compound wound direct current generator to obtain charging current regulation that eliminates the conventional electro-mechanical regulator.

It is another object of the invention to provide a system or apparatus of this character that is extremely simple in operation.

It is still another object of the invention to provide apparatus or a system of this character that has a minimum number of parts and that has no moving parts.

A further object of the invention is to provide a system or apparatus of this character that is compact.

A still further object of the invention is to provide a system or apparatus that is highly effective and reliable in operation.

The characteristics and advantages of the invention are further sufficiently referred to in connection with the following detailed description of the accompanying drawings which represent one embodiment. After considering this example skilled persons will understand that many variations may be made without departing from the principles disclosed and we contemplate the employment of any structures, arrangements or modes of operation that are properly within the scope of the appended claims.

Referring to the drawings, which are for illustrative purposes only:

Figure 1:
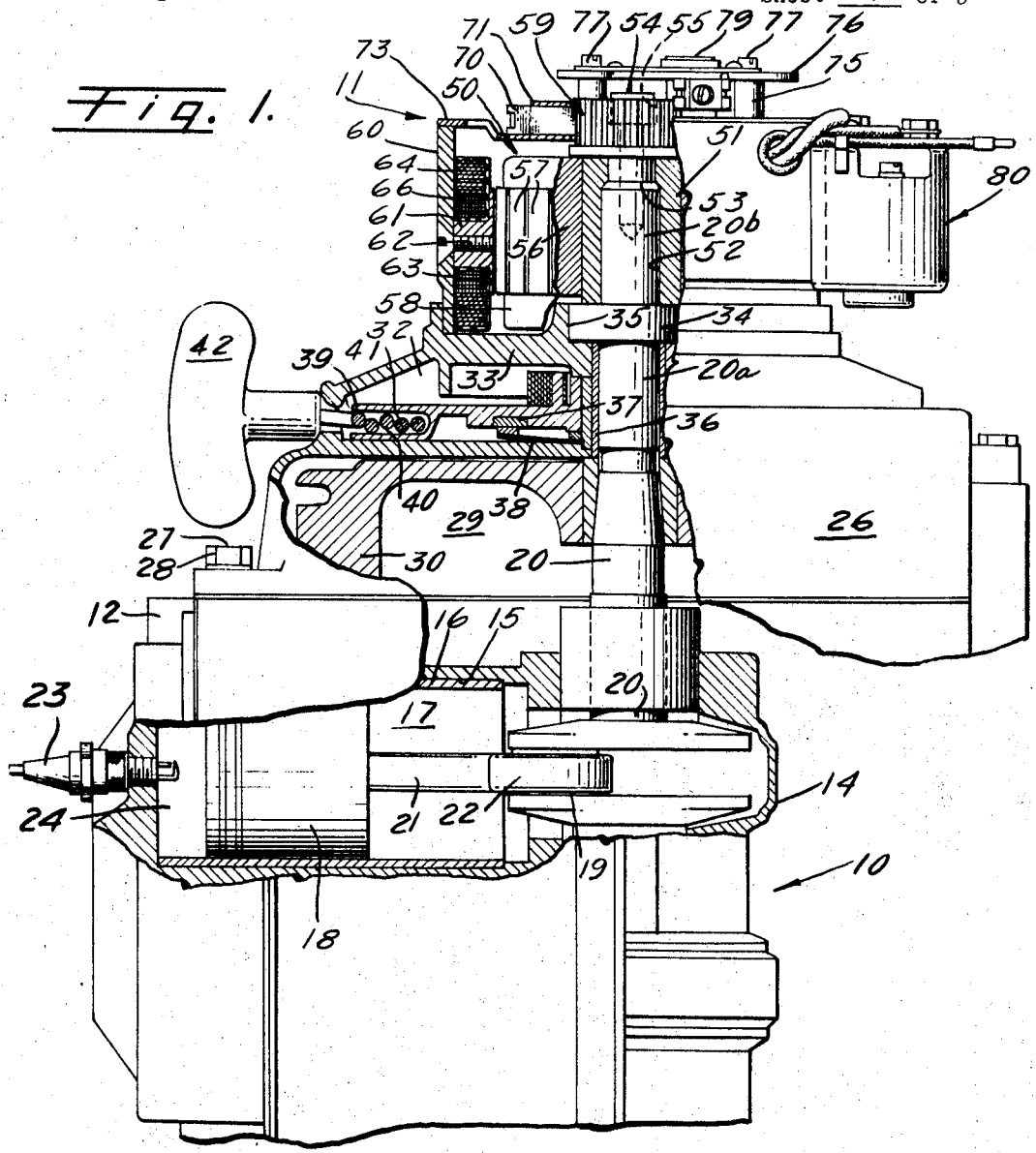
FIG. 1 is a side view of a portion of an internal combustion engine provided with the present invention, portions of the mechanism being broken away and in section.
Figure 2:
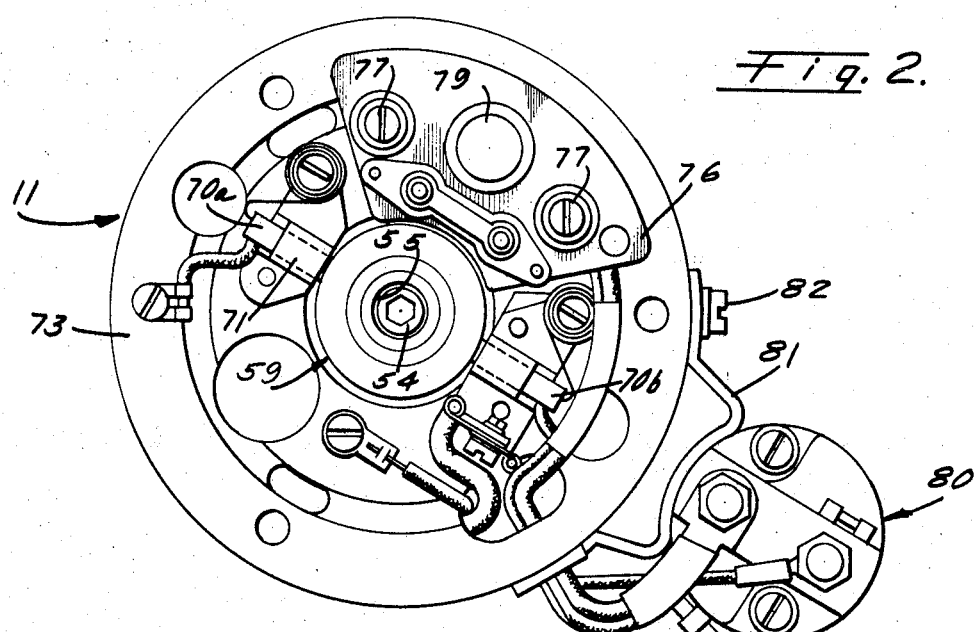
FIG. 2 is a top plan view of the starter-generator system or apparatus with the cover removed.

Referring more particularly to FIG. 1, there is shown a portion of an outboard engine, indicated generally at 10, having a starter generator therefor, indicated generally at 11.

The engine may be of any well known type and includes an engine block 12 and a crankcase 14 therefor. The engine may have one or more cylinders, the engine shown having a plurality of cylinders although only one is shown by the broken away portion of the engine. More specifically, the block is provided with a cylinder bore 15 in which is secured by any well known means a cylinder liner 16 defining a cylinder 17.

Within the cylinder 17 is reciprocably mounted a piston 18 connected to the crank 19 of a crankshaft 20 by a connecting rod 21, one end of said connecting rod being pivotally connected to said piston 18 in the usual well known manner while the opposite end of said connecting rod is provided with a bearing 22 which in turn is connected to the crank 19 of said crankshaft. Bearing 22 may be of any suitable well known character, such as the needle roller bearing, for example.

The engine is also provided with a spark plug 23 for the respective cylinders for igniting fuel mixture in the combustion chamber 24 of the cylinder 17. Any suitable well known ignition system may be used for providing a suitable spark across the points of the spark plug in proper timing.

At the upper end of the engine, as viewed in FIG. 1, there is a starter housing 26 secured to the upper end of the engine by means of bolts 27 and nuts 28 therefor. The housing may, of course, be secured to the engine in any other suitable manner and said housing defines a flywheel chamber 29 in which is disposed a flywheel 30 of any well known character, which is secured to the crankshaft 20 by keying or any other well known means.

Crankshaft 20 is provided with a portion 20a that extends upwardly through a chamber 32 and above the top wall 33 of said chamber. A bearing 34 for said crankshaft is provided and is disposed in a recess 35 at the upper side of the wall 33.

There is a spacer 36 disposed on the lower part of the crankshaft portion 20a and within the chamber 32 is a manual starter mechanism of the usual well known type and construction which includes a starter pawl 37, starter pawl friction spring 38 and starter pulley 39. Pulley 39 has a peripheral groove 40 therein for recption of a spirally wound cord 41 at the free end of which is a handle 42. The inner end of the cord 41 is secured to the pulley in the usual well known manner and the pulley mechanism is connected with the crankshaft in the usual well known manner. The manual starting mechanism is not part of the present invention so that further description thereof is believed to be unnecessary.

The end portion 20b of the crankshaft extends axially upwardly into the starter generator 11 and the armature, indicated generally at 50, is disposed on and secured thereto. The armature has a hub 51 with an axial bore 52 extending from the lower end thereof and terminating in a shoulder 53 adjacent the upper end of the hub. The armature is secured to the shaft portion 20b by any suitable means, such as, for example, an Allen bolt 54, the head of which is disposed in a recess 55 in the upper end of the armature. On the hub are secured the usual laminated discs 56 which are stamped out and provide the annularly spaced poles 57 between which the armature windings or coils 58 are disposed in the usual well known manner, said windings having the usual connections with the commutator 59.

The mechanism includes the usual yoke or housing 60 in which the armature is mounted and to which the cores or pole pieces 61 are secured by screws 62. The pole pieces 61 have flanges 63 spaced from the adjacent wall of the housing or yoke and the field windings 64 are disposed on said core, said windings being of the usual well known character. It is to be noted that the series field windings have a larger inside diameter than the outside diameter of the main portion of the pole pieces and the shunt windings 66 are disposed in the space between the pole pieces and the series windings 64.

The mechanism is provided with the usual brushes 70, indicated at 70a and 70b, and disposed in brush holders 71, said brushes operably contacting the commutator 59. The brushes are mounted on the brush plate 73 which is secured to the upper end of the yoke in any well known manner, as by screws, not shown.

There are a plurality of posts 75 secured to said brush plate and extending upwardly thereof to which a diode heat sink or cooling fin 76 is secured by means of screw 77, or any other suitable means. Secured to the diode sink is blocking diode 79.

The mechanism may be provided with a cover, not shown, and there is an electro-magnetic starting switch, indicated generally at 80, secured to the yoke by means of a bracket 81 and screws 82.

Figure 3:
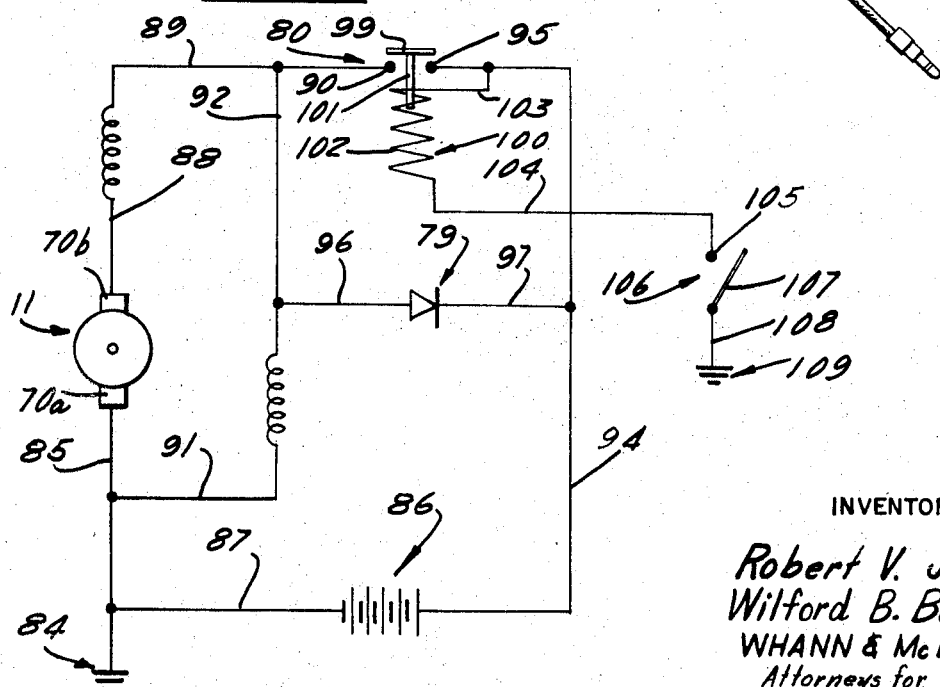
FIG. 3 is a diagram of the electrical system of the invention.

Referring to FIG. 3, which is a diagram of the electrical system, the commutator 59 is provided with the brushes 70a and 70b. Brush 70a is connected to ground, indicated at 84, by means of a wire 85. One side of battery 86 is connected to wire 85 by a wire 87.

One end of the series windings is connected by a wire 88 to the brush 70b, the other end of the series windings being connected by a wire 89 to a fixed contact 90 of the electro-magnetic starter switch 80. One end of the shunt windings is connected by a wire 91 to the wire 85, while the other end thereof is connected by a wire 92 to the wire 89. This arrangement is a method of connection for compound motor generators. The opposite side of battery 86 is connected by a wire 94 with the fixed contact 95 of the starter switch 80. Blocking diode 79 has a connection with the wire 92 by means of a wire 96 and a second connection with the wire 94 by means of a wire 97.

Starter switch 80 includes a movable contact 99 actuated by a solenoid or relay indicated generally at 100 and having an armature 101 to which the movable contact member 99 is secured. The solenoid or relay also has a coil 102 in which the armature is operably received. One end of coil 102 is connected by a wire 103 to the wire 94 from the battery while the other end of said coil 102 is connected by a wire 104 to a fixed contact 105 of a manual control switch, indicated generally at 106. Switch 106 also includes a movable contact 107 which is connected by a wire 108 to ground 109. It is to be understood, of course, that wire 104 may be connected to the movable contact 107 and the wire 108 connected to the fixed contact 105.

There are six poles for the field windings and the shunt field windings comprise 125 turns on each pole piece. The wire for the shunt windings is American Wire, gauge size 22, of copper magnet wire.

When it is desired to start the engine the manual control starter switch 106 is closed, thereby effecting energization of the coil 102 which draws the armature 101 downwardly to bring the movable switch member 99 of the starter switch into bridging contact with the contacts 90 and 95, thereby energizing the starter generator to turn the engine over and start same. Upon opening of the manual control starter switch 106 the solenoid or relay 100 is de-energized and the movable switch member 99 moves away from the contact 90 and 95 to thereby open the starter switch 80. The generator function of the starter generator 11 then commences and delivers current to the battery 86 by means of the respective connections with the opposite sides of said battery. The blocking diode 79 permits current to flow from the starter generator to the battery but prevents reverse flow from the battery to the starter generator, the switch 80 being open to that the current cannot flow from the battery to the starter generator by means of the wire 94, starter switch 80 and wire 89.

Figure 4:
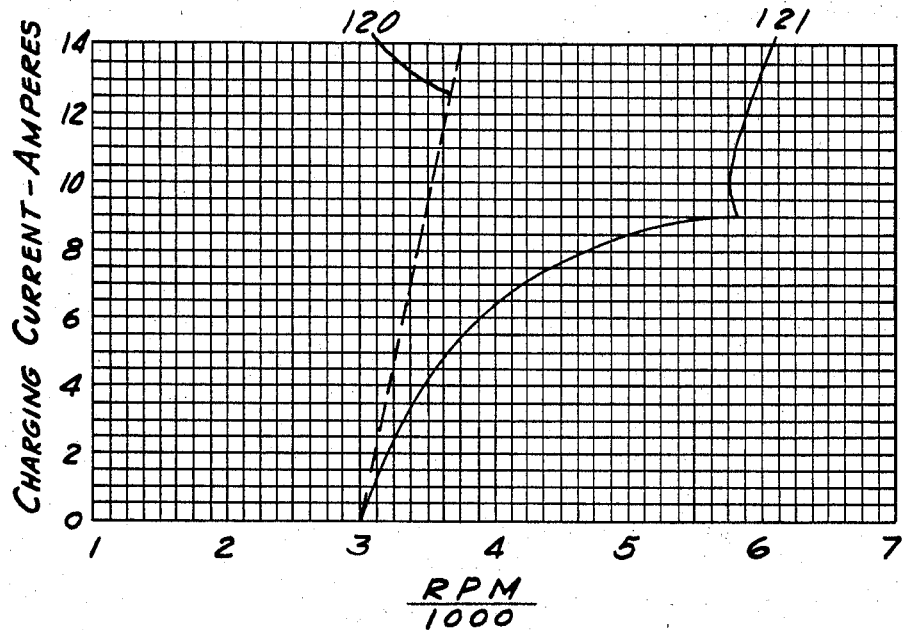
FIG. 4 is a graph showing the initial current output related to engine speed immediately following starting of the engine.

Referring to FIG. 4, the curve 120 shows a current output of an unmodified generator, while curve 121 shows the charging current-speed relationship in the present invention. It is to be understood that the engine is operated at a substantially constant speed of 6000 rpm.

Still referring to FIG. 4 the charging current characteristics of the present invention as shown in this figure is provided by the present invention which operates so that the magnetic field forces produced by the series and shunt field windings are acting in opposition upon the armature when charging current flows through the armature circuit. The opposition of the series field to the shunt field is proportioned by the charging current. At zero current there is little opposition from the series field but with increasing charging current the series field increasingly bucks the shunt field, causing the rate of increase of charging current with armature speed to level off and remain constant.

The reverse current cut-out portion of the mechanism is effected by the diode 79 which is in series with the charging circuit and polarized so charging current can flow into the battery when the generator voltage exceeds battery voltage but blocks current flow from the battery to the generator when the generator voltage is less than battery voltage.

Figure 5:
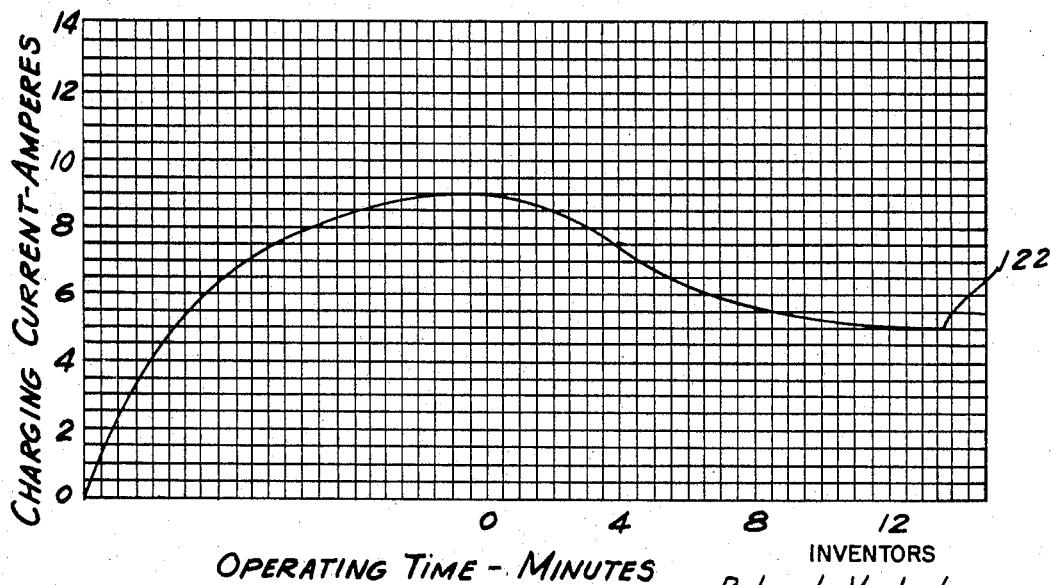
FIG. 5 is a graph showing current output related to operating time.

The curve 122 in FIG. 5 shows the reduction of charging current with time to a predetermined level. This occurs when the shunt field heating due to shunt field current increases the resistance of the winding (temperature coefficient of resistance of copper) causing a reduction in shunt field current. The temperature-current stabilization of the shunt field winding determines the reduction in charging current and is governed by the selection of shunt field turns and wire size for a given winding configuration and motor size, an example of which has been given above. For any motor size the shunt field winding parameters, heat flow paths to the pole piece, yoke area, and ambient temperature, determine the stabilization temperature of said shunt field winding.

The higher rate of change after start-up is advantageous in quickly replacing the starting energy taken from the batteries. The charge rate then tapers back to a safe continuous charge level. Another advantage of the charging current control by temperature stabilization at the field winding is that of charge rate modification by the ambient temperature. At low ambient temperatures where chemical reactions in the battery are inhibited, a longer time is required to reach temperature stabilization and the stabilizing temperature is lower, giving a higher charge rate, thus compensating the ambient temperature effects upon the battery. The same is true at high ambients where battery activity is enhanced, the field temperature stabilization being reached quicker at a higher temperature thereby lowering the charge rate further.

With the arrangement shown in FIG. 3, actuation of the starter switch causes current flow from the battery to the motor, the series field and shunt field aiding in the production of motor torque. The shunt field receives full battery voltage in this arrangement, so that the shunt field current and resultant torque produced is greater than that produced by conventional circuits.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example and we do not wish to be restricted to the specific forms shown or uses mentioned except as defined in the accompanying claims, wherein various portions have been separated for clarity of reading and not for emphasis.

We claim:
1. In a direct-current starter motor-generator system for internal combustion engines, a compound wound motor-generator having shunt field coils and two electrical terminals, means for connecting one terminal to one side of an external circuit, a blocking diode connected between the other terminal and a second side of an external circuit to complete the conduction path from the motor-generator through the external circuit and the blocking diode, said diode being connected to prevent current flow from the external circuit to the motor-generator through the diode and to permit current to flow from the motor-generator to the external circuit when the motor-generator is operating as a generator, and a starter control switch connected in parallel with the blocking diode to selectively provide a path for current from the external circuit to the motor-generator around the blocking diode, the wire of said shunt field coils of said motor-generator having a positive temperature coefficient and a selected size to cause a substantial decrease in the generated voltage of the motor-generator within a selected period of time after the motor-generator begins to operate as a generator.

References Cited

UNITED STATES PATENTS

| | | | |
|---|---|---|---|
| 2,144,445 | 1/1939 | Wilber | 290—50 |
| 2,761,978 | 9/1956 | Piumi | 290—38 XR |
| 2,817,830 | 12/1957 | Raver | 290—50 XR |
| 3,029,350 | 4/1962 | Noddin | 290—31 |
| 3,270,207 | 8/1966 | Stockton | 290—38 XR |
| 1,250,718 | 12/1917 | Turbayne | 290—22 XR |
| 2,534,542 | 12/1950 | Bower | 320—59 XR |
| 3,359,479 | 12/1967 | Crompton | 290—50 XR |

ORIS L. RADER, *Primary Examiner.*

G. SIMMONS, *Assistant Examiner.*

U.S. Cl. X.R.

290—46

UNITED STATES PATENT OFFICE
CERTIFICATE OF CORRECTION

Patent No. 3,426,213                               February 4, 1969

Robert V. Jackson et al.

It is certified that error appears in the above identified patent and that said Letters Patent are hereby corrected as shown below:

Column 1, line 15, "combination" should read -- combustion --. Column 2, line 69, "recption" should read -- reception --. Column 4, line 23, "to" should read -- so --; line 66, "change" should read -- charge --.

Signed and sealed this 24th day of March 1970.

(SEAL)
Attest:

Edward M. Fletcher, Jr.
Attesting Officer

WILLIAM E. SCHUYLER, JR.
Commissioner of Patents